(12) United States Patent
Cook, Jr.

(10) Patent No.: US 6,340,394 B1
(45) Date of Patent: Jan. 22, 2002

(54) SILO GRANULAR FEED DISTRIBUTION AND LADDER CHUTE APPARATUS

(75) Inventor: William H. Cook, Jr., Lakeland, FL (US)

(73) Assignee: ARR-MAZ Products, L.P., Winter Haven, FL (US)

(*) Notice: Subject to any disclaimer, the term of this patent is extended or adjusted under 35 U.S.C. 154(b) by 0 days.

(21) Appl. No.: 09/520,652

(22) Filed: Mar. 7, 2000

Related U.S. Application Data

(60) Provisional application No. 60/163,810, filed on Nov. 5, 1999.

(51) Int. Cl.[7] .............................. B05B 17/00; B05D 7/00
(52) U.S. Cl. ......................................... 118/303; 118/17
(58) Field of Search ........................... 118/303, 17, 302, 118/313, 317, 13, 24; 427/212

(56) References Cited

U.S. PATENT DOCUMENTS 4,921,674 A * 5/1990 Enos .......................... 422/28

* cited by examiner

Primary Examiner—Richard Crispino
Assistant Examiner—Yewebdar T Tadesse
(74) Attorney, Agent, or Firm—Dennis G. LaPointe; Mason & Assocites, P.

(57) ABSTRACT

A granular feed distribution and ladder chute apparatus for use within a silo comprising a ladder chute portion with internal alternating and staggered flights. One or more nozzles are located near the upper end of the ladder chute portion. Each nozzle is directed such that a spray pattern may be formed for spraying a concentration of a conditioning agent on a falling granular feed. Predetermined selected flights include cut-out portions arranged in a predetermined alternating sequence on the flights so that a distributed portion of the granular feed can fall directly through the cut-out portion in one flight onto another flight located on a same side from which the granular feed fell. Holes are included in the ladder chute portion, which not only as access for cleaning and inspecting the flights, but also for facilitating the distribution of granular feed into an area outside the perimeter of the ladder chute portion and within the silo. A transition in cooperative engagement with the upper end of the ladder chute portion is preferably included. The bottom section of the transition portion is configured with an internally directed crowned section to facilitate the spreading of the granular feed into the ladder chute.

27 Claims, 11 Drawing Sheets

SILO GRANULAR FEED DISTRIBUTION AND LADDER CHUTE APPARATUS

This application claims benefit to U.S. application Serial No. 60/163,810, filed Nov. 5, 1999.

BACKGROUND OF THE INVENTION

1. Field of the Invention

The invention relates to a feed distribution and ladder chute system for use in silos or bins wherein granular fertilizer is fed and stored. The invention further relates to the application of conditioning agents, including dust control agents and anti-caking agents, to the granular material as it is being fed into the storage bin or silo.

2. Description of Related Art

Most storage practices for granular fertilizer involves the storage of fertilizer in piles. When dust control or anti-caking measures are taken, conditioning agents such as dust control and anti-caking agents, are applied and mixed with the pile.

In certain circumstances, it is desirable to store the granular fertilizer in holding bins or hopper type compartments such as a silo. In such circumstances, it is important that dust control measures be effectively applied to prevent caking, lower dust levels, and to effectively work the stored pile.

An objective or advantage of the present invention is to provide an apparatus which will enable the granular fertilizer to be evenly fed and distributed into the silo with a falling curtain type effect. Another advantage of this effect is that dust control or anti-caking agents can be applied effectively to the granular material as it is falling into the silo through the invention, thereby providing an efficient method of reducing dust levels within a silo while minimizing the caking of the granular fertilizer.

SUMMARY OF THE INVENTION

The present invention is a granular feed distribution and ladder chute apparatus for use within a silo. The apparatus includes a longitudinal vertically oriented ladder chute portion having four sides, a bottom end, and an upper end, the four sides forming a rectangular shaped chute, wherein two opposite sides are parallel to each other and wider than the corresponding shorter opposite and parallel sides.

The ladder chute portion has a plurality of flights or inwardly directed extensions. The flights are a predetermined width and each is fixed to one of two opposing internal sides of the ladder chute portion, preferably the wider sides of the ladder chute portion. Each flight further extends angularly from the wider side a predetermined length downwardly toward a center of the ladder chute.

For example, a typical application of the present invention may include a rectangular shaped ladder chute portion, where the ladder chute portion may have dimensions of about 36 inches on the wider sides and 18 inches on the shorter sides. The flights then would typically extend the full width inside the wider sides and the angular extension would typically be at about 45° from the vertical wider side. The ladder chute portion and flights would typically be made from a material suitable to withstand the compressive pressures of granular fertilizer in a relatively tall silo, for example, 15 to 25 feet. In this application, ¼ inch thick carbon steel may be used as a suitable construction material. In some circumstances, the use of non-corrosive materials such as Class 300 series stainless steels or corrosion resistant materials such as Class 400 series stainless steels may be preferred depending on the application. Of course, as stronger materials are developed, especially with non-corrosive materials such as fiber-reinforced polymers, these materials may also be considered for constructing the ladder chute portion with flights.

The flights are also staggered along the opposing opposite sides such that they alternate in a predetermined space-apart relationship.

Predetermined flights may optionally have cut-out portions or apertures from a section of the flight. Preferably, these cut-out portions or apertures are of a predetermined depth and width on a predetermined section of the flight, typically, a proximal side, a middle section, or a distal side. When such apertures are included in the invention, they are arranged in a predetermined alternating sequence on the plurality of flights wherein a distributed portion of the fed granular material can fall directly from a flight on one of the wider sides to another flight located on the same side of the one of the wider sides from which the granular material fell. These features further facilitate the mixing of the falling granular material, which has been previously coated with the dust control and anti-caking agents as hereinafter described.

Most hopper bins or silos have ladders or utilize other means for lowering personnel into the bin or silo. These means can be utilized to lower personnel inside a silo to inspect and clean out the flights. The clean out is done through a plurality of alternating access holes acting as means for access to the interior of the ladder chute. Each clean out or access hole is located on the wider sides substantially aligned opposite each flight inside the ladder chute portion. This alignment allows personnel to reach in and clean out and/or inspect the flight and the area around it.

The access holes further facilitate the spreading and distribution of the granular material or feed into the area in the silo around the ladder chute portion. As the granular material piles up inside the area encompassed by the ladder chute portion to an elevation level with an access hole, the granular material will begin to spill out into the surrounding area in the silo around the ladder chute portion to eventually fill the silo. Personnel can be lowered into the silo on top of the pile to inspect and/or clean out the ladder chute and flights through yet to be covered access holes.

Granular feed material is directed to the interior of the ladder chute portion at its upper end through a feeder chute or granular feed transition portion which is in cooperative engagement with the upper end of the ladder chute. Granular material is provided from a source into the transition portion, which is typically constructed from heavy duty sheet metal or plate sheets similar to a ventilation duct transition piece. The bottom section of the transition portion is preferably configured, although it need not be so configured, with an internally directed crowned section aligned with the approximate centerline of the transition portion such that when the granular material slides down over the bottom surface of the crowned section of the transition portion, the material spreads into a wider pattern thereby facilitating a more even distribution of the granular material into the ladder chute portion.

The end of the crowned section from which the granular material drops into the ladder chute may further have downwardly directed lip which provides additional structural support for the crowned portion to maintain its shape while the granular material is being fed over it.

In another embodiment of the transition portion, an extended portion of the bottom of the transition portion extends from the end of the crowned section a predetermined distance and width from the bottom of the lip portion of the crowned section or a predetermined distance and width from the end of the surface of the crowned section. This extended portion may optionally have a downwardly extending lip to further strengthen the configuration at the end of the extended portion from which the granular material falls into the ladder chute portion. The transition assembly or portion can be manufactured by numerous methods, including integrally welding each joint, riveting, sheet metal lap joints and other methods known in the art, keeping in mind that the gauge or thickness of the material chosen and the method of fabrication must be sufficient to maintain the configuration of the transition portion while the weight of the granular material is passing over its bottom surface.

In either embodiment of the feeder chute, the end from which the granular materials falls off the bottom surface into the ladder chute is preferably a width approximately equal to the interior width of the wider side of the ladder chute. This will enable an optimum spread and distribution of the granular material into the ladder chute. The angular orientation of the feeder chute with the ladder chute is such as to facilitate gravitational flow of the granular material into the ladder chute opening. For example, a typical angle between the centerline of the feeder chute or transition portion and the centerline extending downwardly into the ladder chute is preferably approximately 140°, although other slopes may be used.

Proximate the end of the upper end of the ladder chute, one or more nozzles are located on one, two, three or all 4 sides of the ladder chute. Each nozzle is installed and directed such that a predetermined spray pattern may be formed for spraying a concentration of dust control agent and/or anti-caking agent on the falling granular feed material. In this way the granular material may be coated with the agent at a sufficient concentration to control dust levels and/or to prevent caking of the granular material.

The falling material is tossed from one side of the ladder chute to the other side. This tossing is facilitated by the flights or slats. The notched flights serve to add a rolling effect to the granular material.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
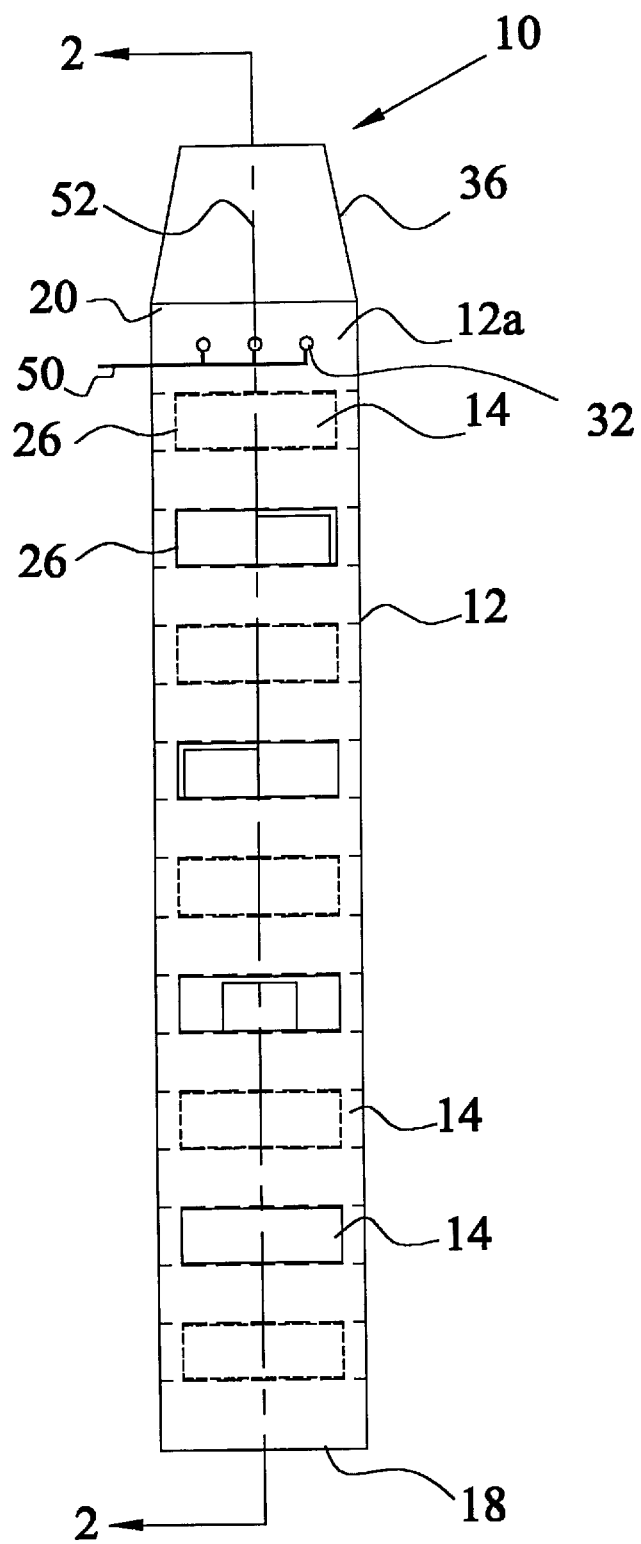
FIG. 1 is a schematic front view of the transition and ladder chute portions depicting the flights as hidden lines.

Referring now to the drawings, in particular FIGS. 1–6, the invention which is a granular feed distribution and ladder chute apparatus for use within a silo and is depicted generally as 10, comprises a longitudinal vertically oriented ladder chute portion 12 having four sides, 12a, 12b, 12c, 12d respectively, a bottom end 18, and an open upper end 20, the four sides 12a, 12b, 12c, 12d forming a rectangular shaped chute, wherein two opposite sides are parallel to each other and wider 12a, 12b than corresponding shorter opposite and parallel sides 12c, 12d. Although the bottom end 18 need not be open, it is typical that it be open. Typically, to construct the ladder chute portion 12, the width of wider sides 12a, 12b is generally determined by applying a ½ inch of width per ton per hour if the reagent is applied through nozzles 32 on both sides of the falling curtain 54 and ¼ inch of width per ton per hour if the reagent is applied through nozzles 32 on one side only. This normally minimum dimension is based on a bulk density for the fertilizer of 60 pounds per cubic foot.

The ladder chute portion 12 has a plurality of flights 14 which are inwardly directed extensions of a predetermined width. Each flight 14 is fixed to one of two opposing internal sides, preferably 12a, 12b, of the ladder chute portion 12, and extend angularly from the one of two opposing internal sides a predetermined length downwardly toward a center of the ladder chute, depicted by centerline 16 in FIG. 2.

Figure 2:
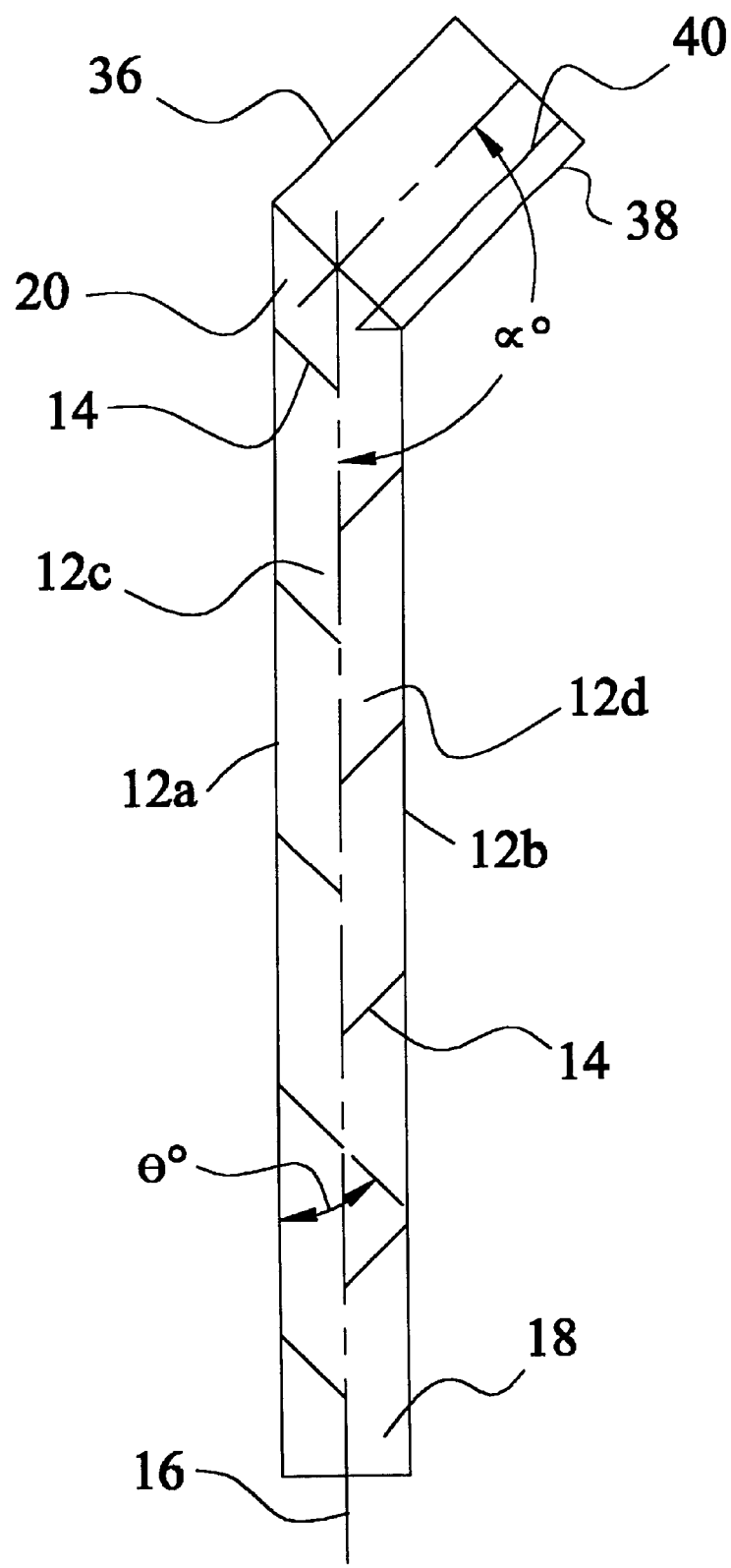
FIG. 2 is a schematic sectional view taken from section 2—2 of FIG. 1.
Figure 4:
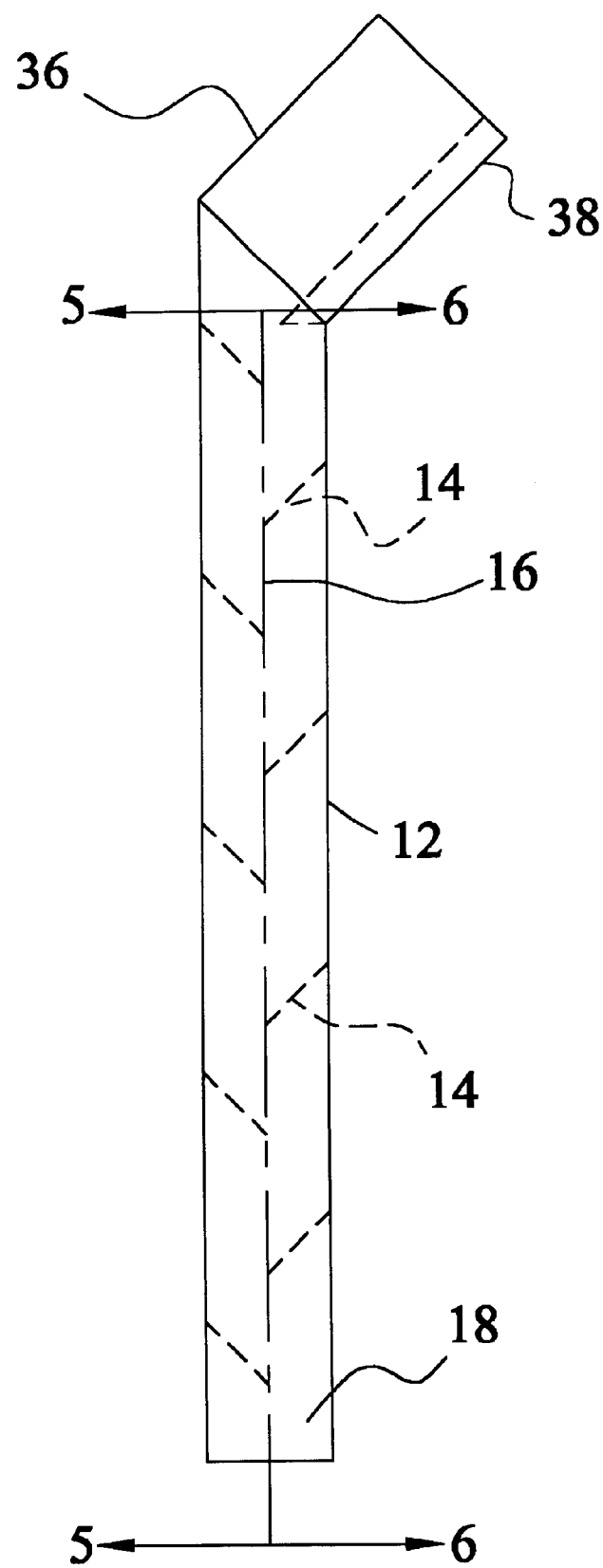
FIG. 4 is a schematic view of the side view of FIG. 1.
Figure 5:
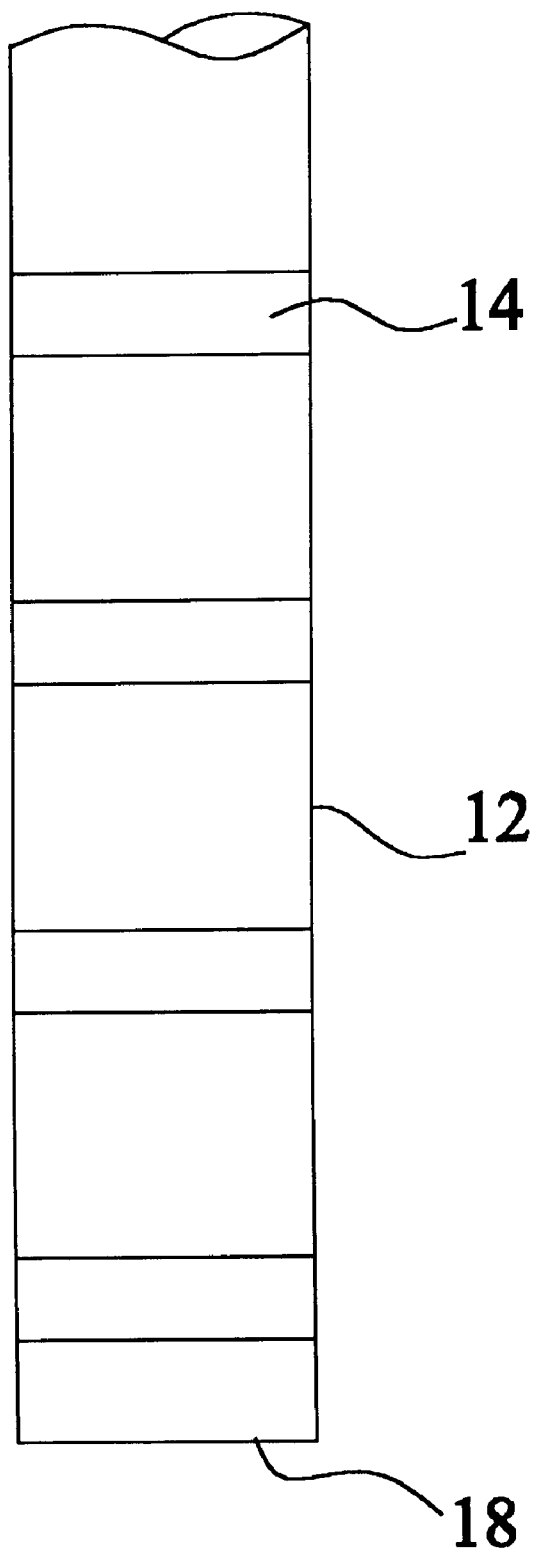
FIG. 5 is a partial sectional schematic view depicting a typical arrangement of flights taken from view 5—5 of FIG. 4.
Figure 6:
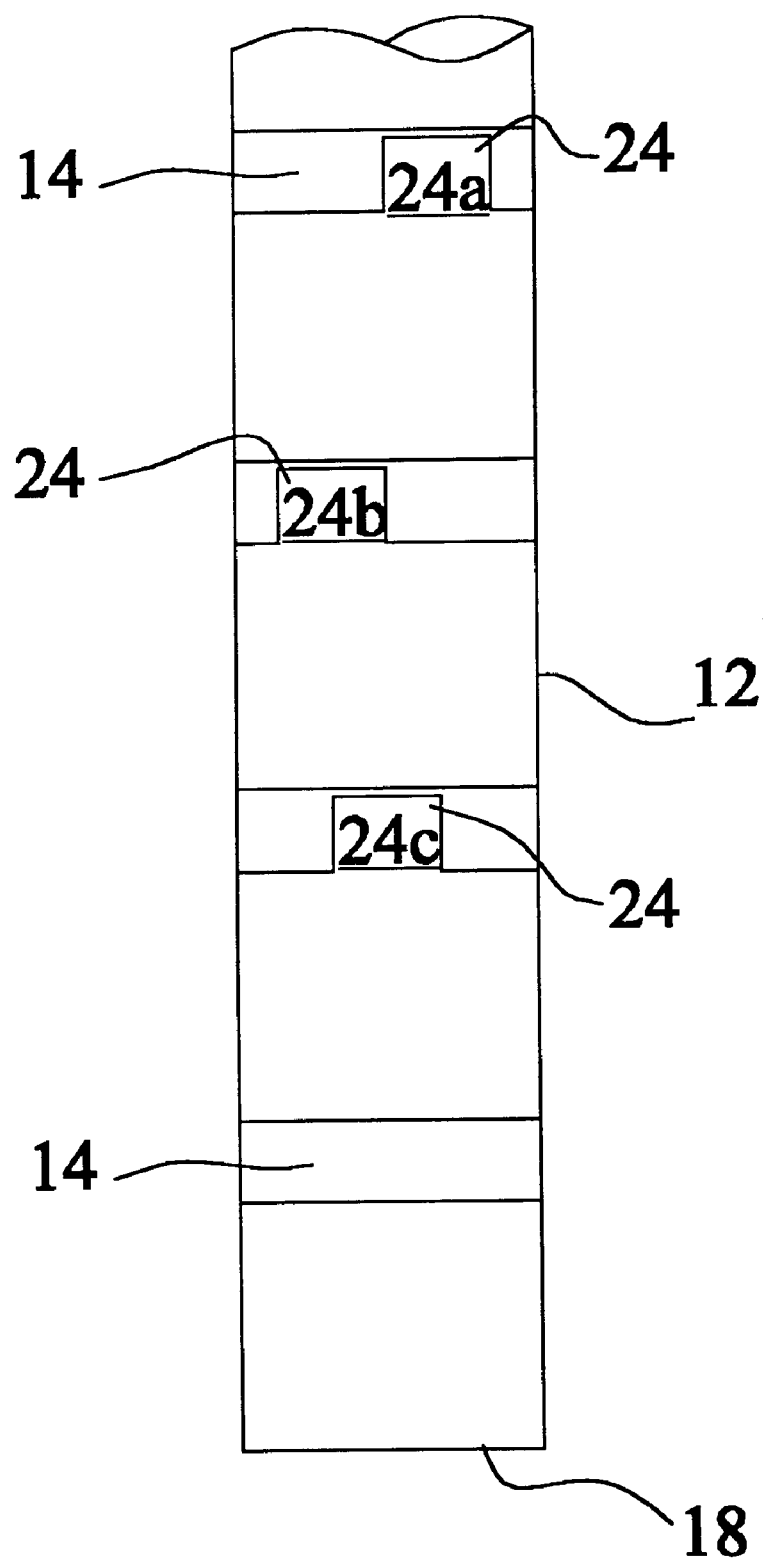
FIG. 6 is a partial sectional schematic view depicting taken from view 6—6 of FIG. 4 with an added depiction of a typical arrangement for the staggered notches on the flights.

The plurality of flights 14 are typically staggered along opposing opposite internal sides such that the flights 14 alternate in a predetermined space-apart relationship between the bottom end 18 and the upper end 20 of the ladder chute portion 12, as generally depicted in FIGS. 2 and 4. For example, from the bottom end 18 of the ladder chute portion 12, the first flight 14 may be about 20 inches from the bottom end 18 on one side 12a while the next flight 14 may be staggered and located on the opposite side 12b about 38 inches from the bottom end 18, each staggered and alternating flight 14 extending the predetermined space-apart distance along opposite sides to the upper end 20 of the ladder chute portion 12.

At least one nozzle 32 is located at at least one of the four sides proximate the upper end 20 of the ladder chute portion 12. The nozzles 32 are directed such that a predetermined spray pattern 34 may be formed for spraying a concentration of a conditioning agent 50, consisting generally as dust control agent and anti-caking agents, on a falling granular feed 30.

It is preferable that the flights 14 be fixed to the wider sides 12a, 12b of the ladder chute portion 12. In a practical application of the invention, the flights 14 extend angularly at an angle of approximately 45°, as depicted by angle θ in FIG. 1.

A typical application of the present invention 10 may include a rectangular shaped ladder chute portion 12, where the ladder chute portion 12 may have dimensions of about 36 inches on the wider sides 12a, 12b and 18 inches on the shorter sides 12c, 12d. The flights 14 then would typically extend the full width inside the wider sides 12a, 12b and the angular θ extension would typically be at about 450 from the vertical wider side 12a, 12b. The ladder chute portion 12 and flights 14 would typically be made from a material suitable to withstand the compressive pressures of granular fertilizer or feed 30 in a relatively tall silo 22, for example, 15 to 25 feet. In this application, the thickness of the carbon steel should not be less than ¼ inch thick, but ultimately will be determined by the structural design engineer. Of course, as stronger materials are developed, especially non-corrosive materials such as fiber-reinforced polymers, these materials may also be considered for constructing the ladder chute portion 12 with flights 14, as well as the transition portion 36.

In a typical alternative embodiment, predetermined flights 14 are selected to include cut-out portions 24 of a predetermined depth and width on a predetermined section of each of the selected flights 14. As schematically shown in FIG. 1 and particularly, FIG. 6, the cut-out portions 24 may be located on a distal section 24a, a middle section 24c, and a proximal section 24b of a selected flight 14, that is, the cut-out portions 24 are arranged in a predetermined alternating sequence on the flights 14 so that a distributed portion of the granular feed 30 can fall directly through the cut-out portion 24 in one of the flights 14 onto another flight 14 located on a same side from which the granular feed 30 fell.

Figure 3:
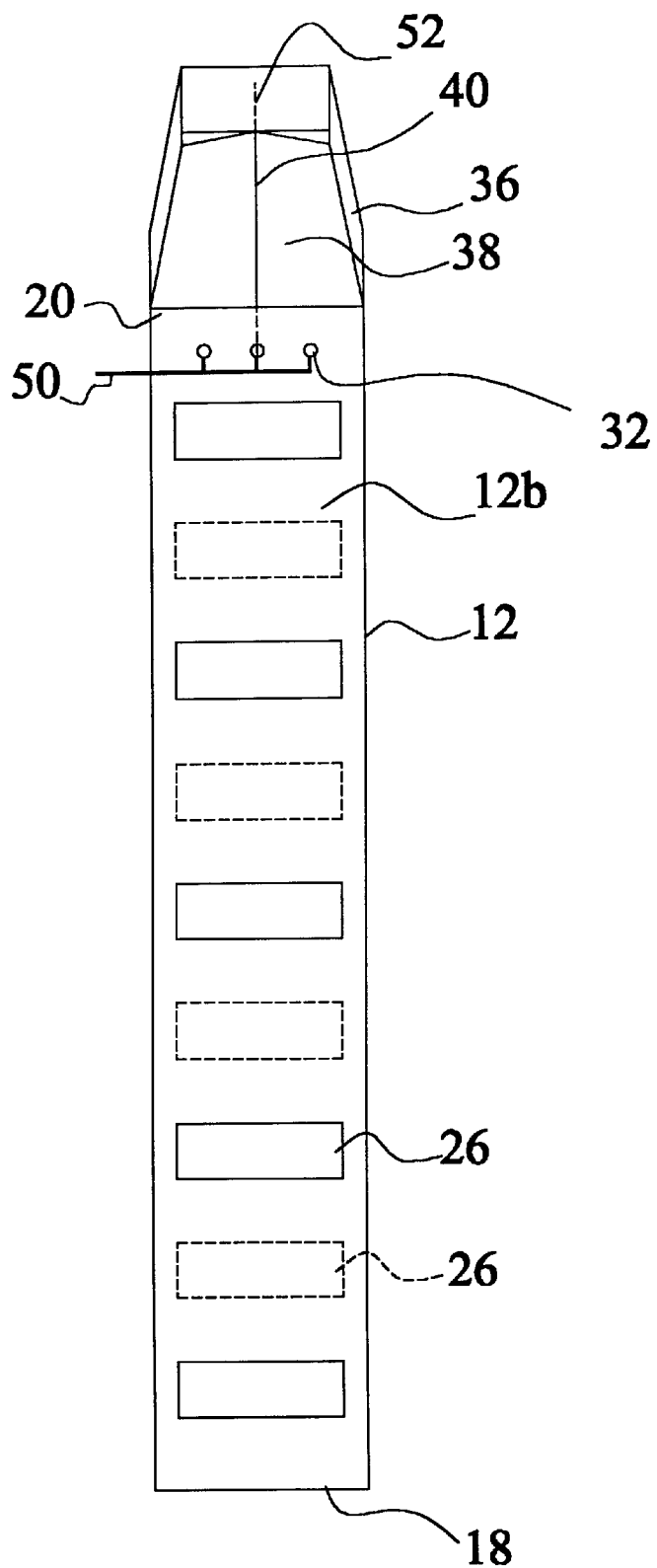
FIG. 3 is a schematic back view of the transition and ladder chute portions depicting the alternating access holes and typical nozzle locations.
Figure 10:
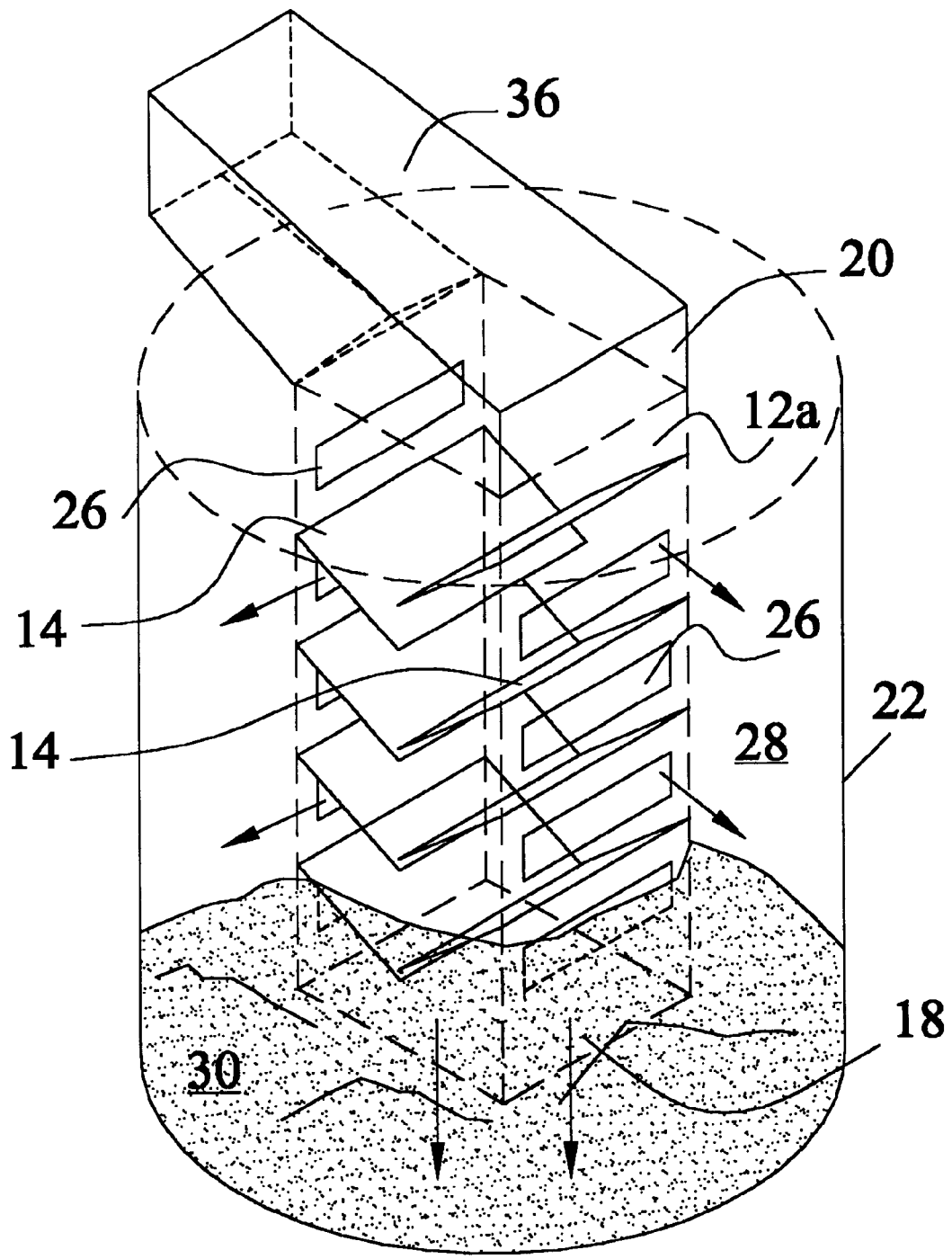
FIG. 10 is a schematic depiction of the ladder chute depicting the directional methods, as shown by the arrows, by which the granular material fills the bin through the bottom of the ladder chute and the access holes.

As shown on FIGS. 1, 3 and 10, means 26 for cleaning and inspecting the plurality of flights 14 are optionally provided. The means 26 also facilitate the distribution of granular feed 30 into an area 28 outside the perimeter of the ladder chute portion 12 and within the silo 22. The means 26 comprises a plurality of alternating access holes located on opposite sides of the ladder chute portion, each access hole which are preferably substantially aligned opposite each flight 14, or predesignated flights 14, so as to allow a person to reach from outside the ladder chute portion 12 to clean and inspect the flights. Typically, personnel can be lowered into the silo 22, if necessary, to inspect the flights 14 through an access hole, and if necessary, clean the surface of the flight 14 through the access hole. Further, as depicted in FIG. 10 by the arrows, granular feed 30 is typically fed from a source or supply through the transition portion 36 into the ladder chute 12 and within the silo 22 storage area, including the area 28 around the perimeter of the ladder chute 12, through the access holes 26.

Although granular feed 30 could be fed directly into the ladder chute 12 upper end 20, in a typical application it is preferable that a granular feed transition portion 36 be provided for facilitating the granular feed from a source or supply of granular feed 30 to the upper end of the ladder chute portion 12. The transition portion 36 is in cooperative engagement with the upper end 20 of the ladder chute 12 and is typically oriented from the vertical ladder chute 12 at an angle depicted generally as a in FIG. 2.

For example, a typical angle between the centerline 52 of the feeder chute or transition portion 36 and the centerline 16 extending downwardly into the ladder chute is preferably approximately 140°, although other slopes may be used. In addition, the transition portion 36 is generally a heavy gauge portion manufactured similar to a sheet duct transition to adapt to the upper end 20 of the ladder chute 12. The portions 12,36 can be jointed mechanically or welded, as afore-described in the above summary of the invention.

In a typical application of the invention, a bottom section 38 of the transition portion 36 is configured with an internally directed crowned section 40 aligned approximately symmetrical with an approximate centerline 52 of the transition portion 36 such that as the granular feed 30 slides downwardly over a surface of the bottom section 38 of the transition portion 36, the granular feed 30 spreads into a wider pattern. The falling granular feed 30 forms a falling curtain-like distribution as depicted as 54 in FIG. 9, which further facilitates the distribution of the granular feed 30 into the ladder chute 12.

Even though the gauge of the metal of the bottom section 38 may be designed to accommodate the weight of the falling granular feed 30, it may be more economical to design the bottom section 18 with a downwardly directed lip 42 extending from a discharge edge 44 of the crowned portion 40, as shown in FIGS. 7–9 and 11. This is the edge which will experience the most deflection from the weight of the granular feed 30. Such a lip 42 will provide additional structural strength to withstand the weight of the granular feed 30. It is preferred that the lip 42 be directed slightly inward at about 80° to 90° from the surface of the crowned section. The lip 42 may be formed continually from the material of construction of the transition portion 36 or it may be an angle iron or other bar stock reinforcement member welded to the edge 44. Of course, other means of creating a reinforcement lip 42 are known in the art.

Figure 7:
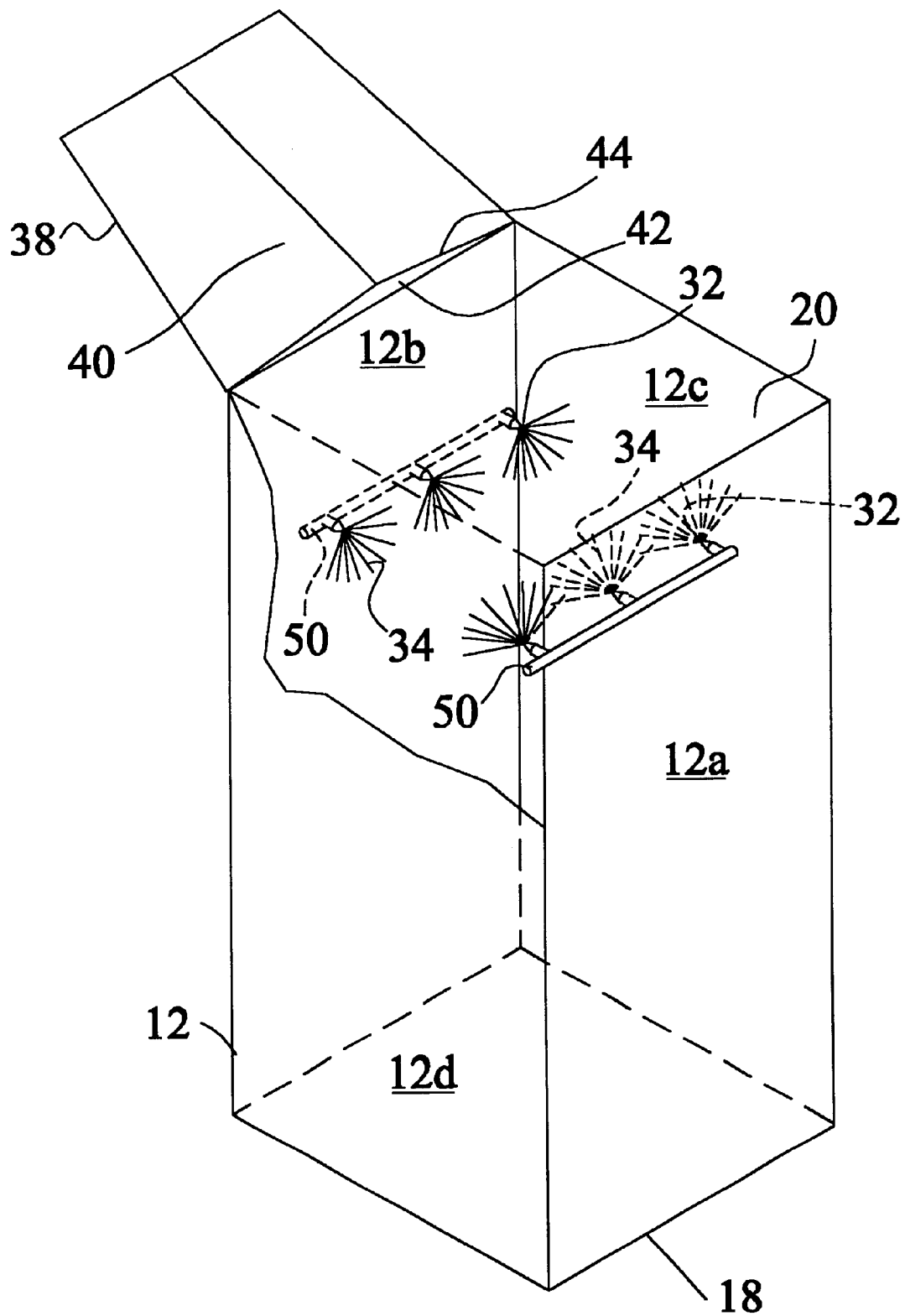
FIG. 7 is a schematic depiction of the transition portion engaged with the ladder chute and typical schematic location of spray nozzles.
Figure 8:
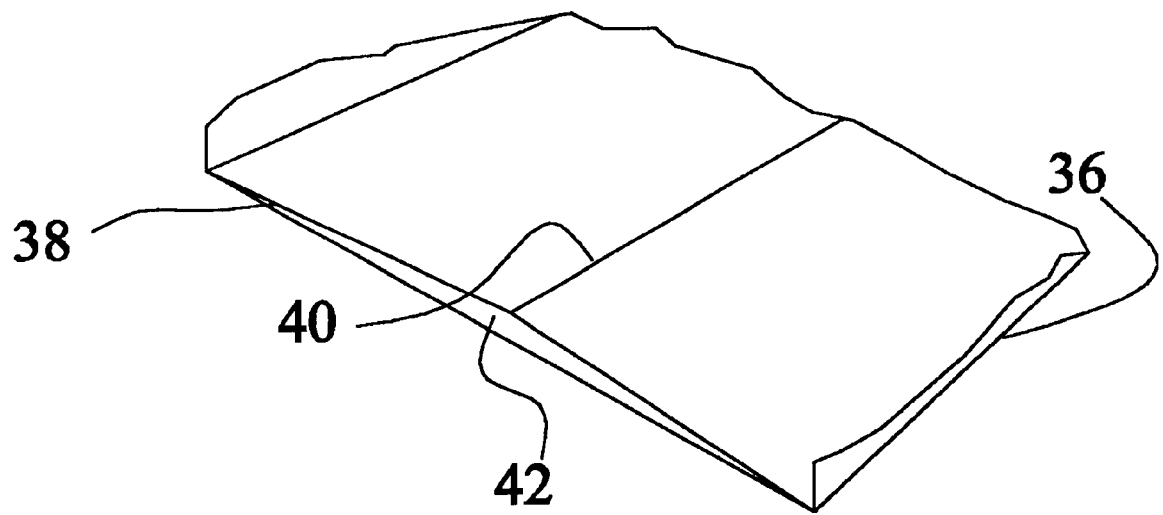
FIG. 8 is a schematic depiction of the crown on the bottom section of the transition portion.
Figure 9:
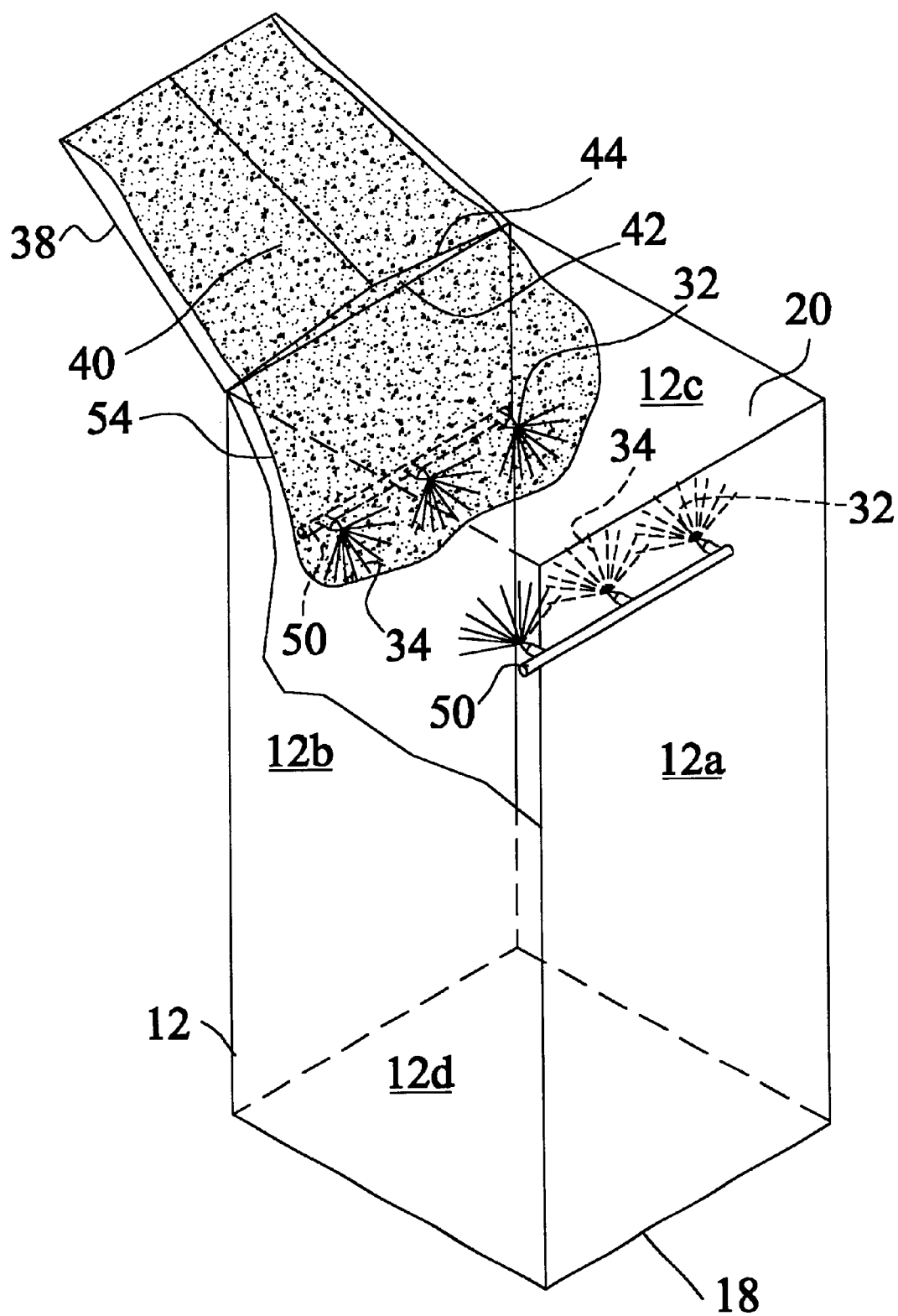
FIG. 9 is a schematic depiction of the granular material falling into the ladder chute.
Figure 11:
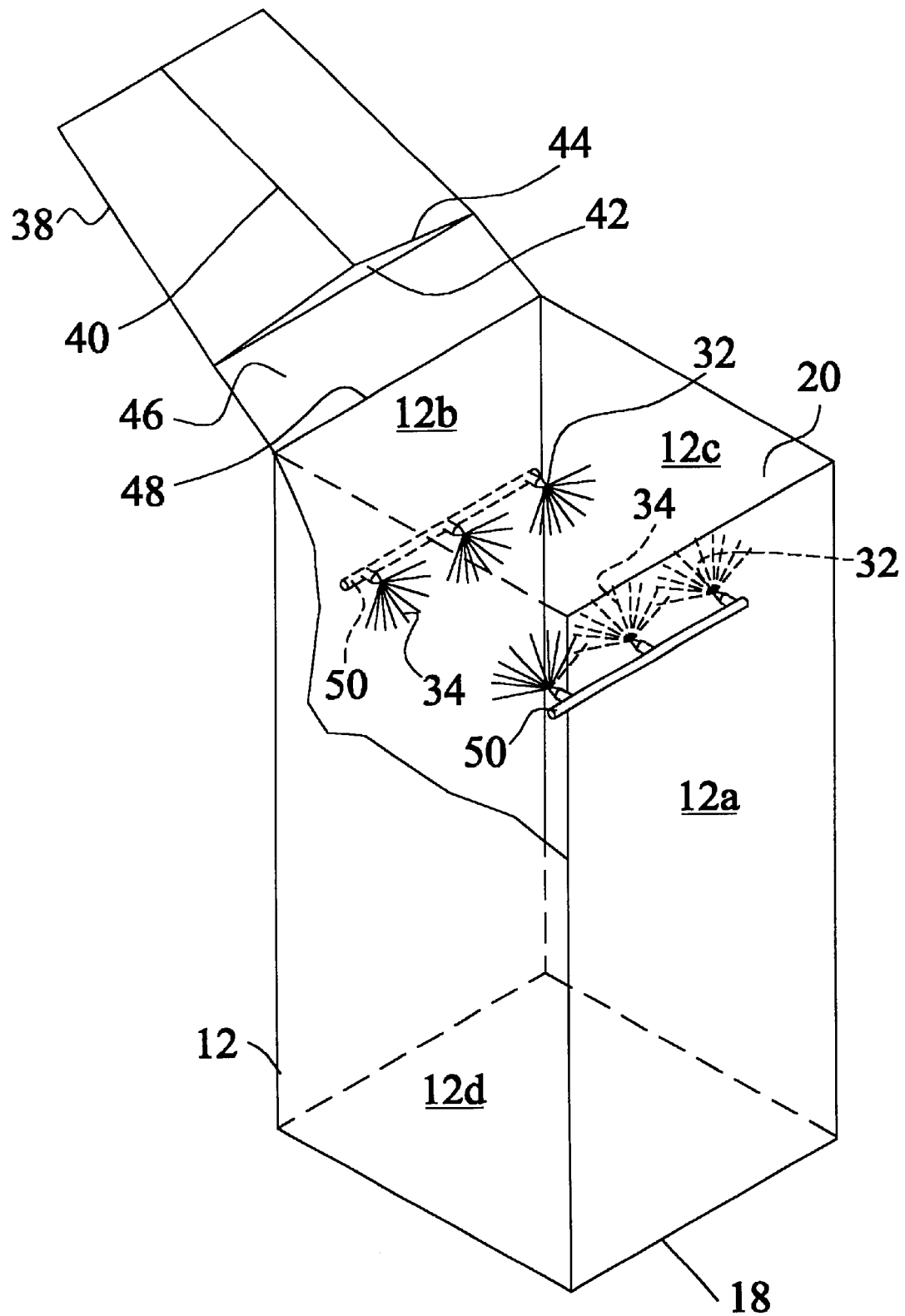
FIG. 11 is a schematic of an additional embodiment of the transition portion depicting an extended portion extending from the crown portion of FIG. 8.

As depicted in FIG. 11, the bottom section 38, including the crown portion 40, has an optional extended substantially flat portion 46 or extension which extends from the discharge edge 44 of the crowned portion 40. In this alternative option, the opposite edge 48 of the extended flat portion 46 is in cooperative engagement with the upper end 20 of the ladder chute 12. FIGS. 7, 9 and 11 depict the bottom section 38 with or without the flat extension 46. The remainder of the transition portion 36, that is, the sides and top of the transition portion 36 are not shown for simplicity of emphasizing the schematic concept of the crowned bottom section 38 and extension 46.

The extended flat portion 46 may also have a downwardly extending lip 56 at an edge 48 juxtaposed the cooperative engagement of the extended flat portion 46 with the ladder chute portion 12 upper end 20.

As seen from the foregoing description, the present invention satisfies a long felt need to provide an apparatus which facilitates the storage of granular fertilizer or similar materials in storage bins or silos.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A granular feed distribution and ladder chute apparatus for use within a silo comprising:
    a longitudinal vertically oriented ladder chute portion having four sides, a bottom end, and an open upper end, the four sides forming a rectangular shaped chute, wherein two opposite sides are parallel to each other and wider than corresponding shorter opposite and parallel sides;
    the ladder chute portion has a plurality of flights, the flights being inwardly directed extensions of a predetermined width and each flight being fixed to one of two opposing internal sides of the ladder chute portion;
    each flight further extending angularly from the one of two opposing internal sides a predetermined length downwardly toward a center of the ladder chute;
    the plurality of flights further being staggered along opposing opposite internal sides such that the plurality of flights alternate in a predetermined space-apart relationship between the bottom end and the upper end of the ladder chute portion; and
    at least one nozzle being located at at least one of the four sides proximate the upper end of the ladder chute portion and above an upper most flight of said plurality of flights, the at least one nozzle being directed such that a predetermined spray pattern may be formed for spraying a concentration of a conditioning agent on a falling granular feed.

2. The apparatus according to claim 1, wherein the flights are fixed to the wider opposite sides of the ladder chute portion.

3. The apparatus according to claim 1, wherein the flights are extend angularly at an angle of approximately 45°.

4. The apparatus according to claim 1, wherein the bottom end is open.

5. The apparatus according to claim 1, wherein predetermined selected flights include cut-out portions of a predetermined depth and width on a predetermined section of each of the selected flights.

6. The apparatus according to claim 5, wherein the cut-out portions are located on each selected flight on one of a distal section, a middle section, and a proximal section of said selected flight.

7. The apparatus according to claim 6, wherein the cut-out portions are arranged in a predetermined alternating sequence on the plurality of flights wherein a distributed portion of the granular feed can fall directly through the cut-out portion in one of said flights onto another of said flights located on a same side from which the granular feed fell.

8. The apparatus according to claim 1, further comprising means for cleaning and inspecting the plurality of flights, said means further facilitating the distribution of granular feed into an area outside the perimeter of the ladder chute portion and within the silo.

9. The apparatus according to claim 8, wherein the means for cleaning and inspecting the plurality of flights comprises a plurality of alternating access holes located on opposite sides of the ladder chute portion, each access hole being substantially aligned opposite each flight so as to allow a person to reach from outside the ladder chute portion to clean and inspect the flights.

10. The apparatus according to claim 1 further including a granular feed transition portion for facilitating the granular feed from a source to the upper end of the ladder chute portion, the transition portion being in cooperative engagement with said upper end of the ladder chute.

11. The apparatus according to claim 10, wherein a bottom section of the transition portion is configured with an internally directed crowned section aligned approximately symmetrical with an approximate centerline of the transition portion such that as the granular feed slides downwardly over a surface of the bottom section of the transition portion, the granular feed spreads into a wider pattern thereby facilitating a distribution of the granular feed into the ladder chute.

12. The apparatus according to claim 11, wherein the bottom section of the transition portion further includes a downwardly directed lip extending from a discharge edge of the crowned section.

13. The apparatus according to claim 12, further comprising an extended substantially flat portion extending from the discharge edge of the crowned portion, wherein an opposite edge of the extended flat portion is in cooperative engagement with the upper end of the ladder chute.

14. The apparatus according to claim 13, wherein the extended flat portion further includes a downwardly extending lip at an edge juxtaposed the cooperative engagement of the extended flat portion with the ladder chute portion upper end.

15. A granular feed distribution and ladder chute apparatus for use within a silo comprising:
    a longitudinal vertically oriented ladder chute portion having four sides, a bottom end, and an open upper end, the four sides forming a rectangular shaped chute, wherein two opposite sides are parallel to each other and wider than corresponding shorter opposite and parallel sides;
    the ladder chute portion has a plurality of flights, the flights being inwardly directed extensions of a predetermined width and each flight being fixed to one of two opposing internal sides of the ladder chute portion;
    each flight further extending angularly from the one of two opposing internal sides a predetermined length downwardly toward a center of the ladder chute;
    the plurality of flights further being staggered along opposing opposite internal sides such that the plurality of flights alternate in a predetermined space-apart relationship between the bottom end and the upper end of the ladder chute portion;
    predetermined selected flights include cut-out portions of a predetermined depth and width on a predetermined section of each of the selected flights; and
    at least one nozzle being located at at least one of the four sides proximate the upper end of the ladder chute portion, the at least one nozzle being directed such that a predetermined spray pattern may be formed for spraying a concentration of a conditioning agent on a falling granular feed.

16. The apparatus according to claim 15, wherein the flights are fixed to the wider opposite sides of the ladder chute portion.

17. The apparatus according to claim 16, wherein the flights are extend angularly at an angle of approximately 45°.

18. The apparatus according to claim 15, wherein the bottom end is open.

19. The apparatus according to claim 15, wherein the cut-out portions are located on each selected flight on one of a distal section, a middle section, and a proximal section of said selected flight.

20. The apparatus according to claim 19, wherein the cut-out portions are arranged in a predetermined alternating sequence on the plurality of flights wherein a distributed portion of the granular feed can fall directly through the cut-out portion in one of said flights onto another of said flights located on a same side from which the granular feed fell.

21. The apparatus according to claim 15, further comprising means for cleaning and inspecting the plurality of flights, said means further facilitating the distribution of granular feed into an area outside the perimeter of the ladder chute portion and within the silo.

22. The apparatus according to claim 21, wherein the means for cleaning and inspecting the plurality of flights comprises a plurality of alternating access holes located on opposite sides of the ladder chute portion, each access hole being substantially aligned opposite each flight so as to allow a person to reach from outside the ladder chute portion to clean and inspect the flights.

23. The apparatus according to claim 15 further including a granular feed transition portion for facilitating the granular feed from a source to the upper end of the ladder chute portion, the transition portion being in cooperative engagement with said upper end of the ladder chute.

24. The apparatus according to claim 23, wherein a bottom section of the transition portion is configured with an internally directed crowned section aligned approximately symmetrical with an approximate centerline of the transition portion such that as the granular feed slides downwardly over a surface of the bottom section of the transition portion, the granular feed spreads into a wider pattern thereby facilitating a distribution of the granular feed into the ladder chute.

25. The apparatus according to claim 24, wherein the bottom section of the transition portion further includes a downwardly directed lip extending from a discharge edge of the crowned section.

26. The apparatus according to claim 25, further comprising an extended substantially flat portion extending from the discharge edge of the crowned portion, wherein an opposite edge of the extended flat portion is in cooperative engagement with the upper end of the ladder chute.

27. The apparatus according to claim 26, wherein the extended flat portion further includes a downwardly extending lip at an edge juxtaposed the cooperative engagement of the extended flat portion with the ladder chute portion upper end.

* * * * *

UNITED STATES PATENT AND TRADEMARK OFFICE
CERTIFICATE OF CORRECTION

| | | |
|---|---|---|
| PATENT NO. | : 6,340,394 B1 | Page 1 of 1 |
| DATED | : January 22, 2002 | |
| INVENTOR(S) | : William H. Cook, Jr. | |

It is certified that error appears in the above-identified patent and that said Letters Patent is hereby corrected as shown below:

<u>Column 5,</u>
Line 5, replace "about 450 from" with -- about 45° from --.

Signed and Sealed this

Thirtieth Day of April, 2002

Attest:

Attesting Officer

JAMES E. ROGAN
*Director of the United States Patent and Trademark Office*